United States Patent [19]

Praz

[11] Patent Number: 5,360,150
[45] Date of Patent: Nov. 1, 1994

[54] ROOF RACK FOR VEHICLES

[76] Inventor: Jean-Luc Praz, 1997 Haute-Nendaz, Switzerland

[21] Appl. No.: 54,739

[22] Filed: Apr. 29, 1993

[30] Foreign Application Priority Data

May 4, 1992 [CH] Switzerland .................. 1414-92
May 7, 1992 [CH] Switzerland .................. 1463-92

[51] Int. Cl.5 ............................................. B60R 9/04
[52] U.S. Cl. ............................. 224/310; 414/462; 224/280; 224/281; 224/320
[58] Field of Search ............... 224/281, 282, 310, 315, 224/320; 414/462

[56] References Cited

U.S. PATENT DOCUMENTS

| 2,551,351 | 5/1951 | Swenson | 224/310 X |
| 4,003,485 | 1/1977 | Edgerton | 224/310 X |
| 4,350,471 | 9/1982 | Lehmann | 414/462 X |
| 4,446,998 | 5/1984 | Taig | 414/462 X |
| 4,826,387 | 5/1989 | Audet | 414/462 |

FOREIGN PATENT DOCUMENTS

| 14374 | 5/1969 | Australia | 414/462 |
| 67723 | 12/1982 | European Pat. Off. | 224/310 |
| 511179 | 10/1992 | European Pat. Off. | 224/310 |
| 2673404 | 9/1992 | France | 224/310 |
| 146655 | 7/1986 | Japan | 224/310 |
| 2118501 | 11/1983 | United Kingdom | 224/310 |

Primary Examiner—Ernest G. Cusick
Attorney, Agent, or Firm—Panitch, Schwarze, Jacobs & Nadel

[57] ABSTRACT

The invention concerns a roof rack for vehicles which is provided with a mechanism for extension (11, 2, 3, 4) permitting to lower the surface of manipulation for the load laterally of the car, in order to permit easy manipulations of all types of load which one may wish to carry on the roof of the car. During the lowering, the surface of manipulation remains horizontal. After the fixing of the load on the lowered support surface, the mechanism is lifted again and shifted over the roof of the car by a combination of horizontal and vertical movements and thereafter latched in its final position.

23 Claims, 6 Drawing Sheets

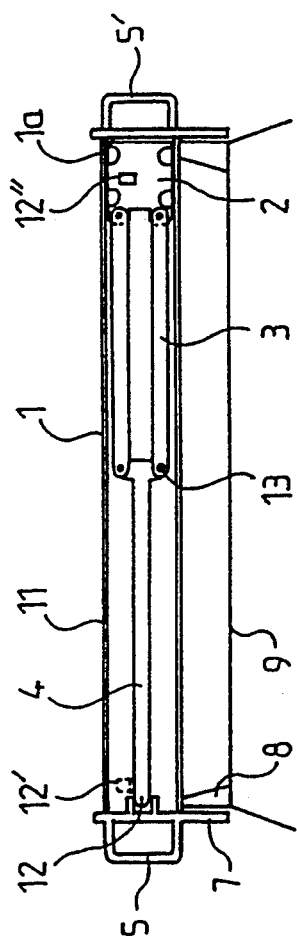
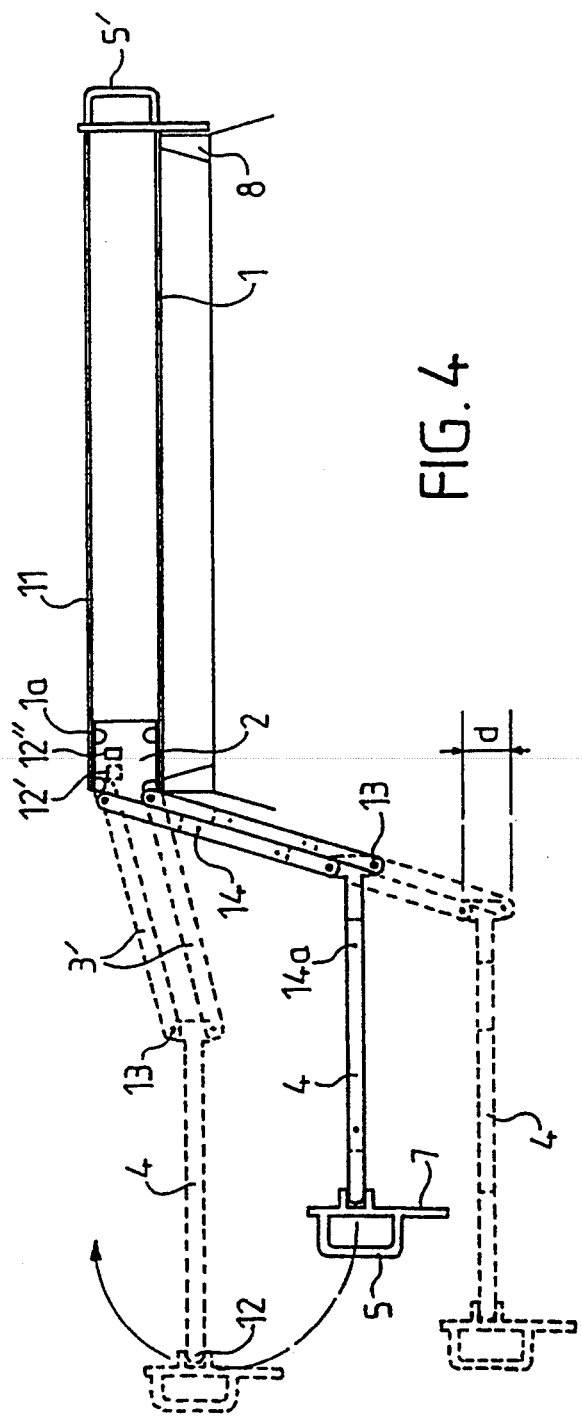

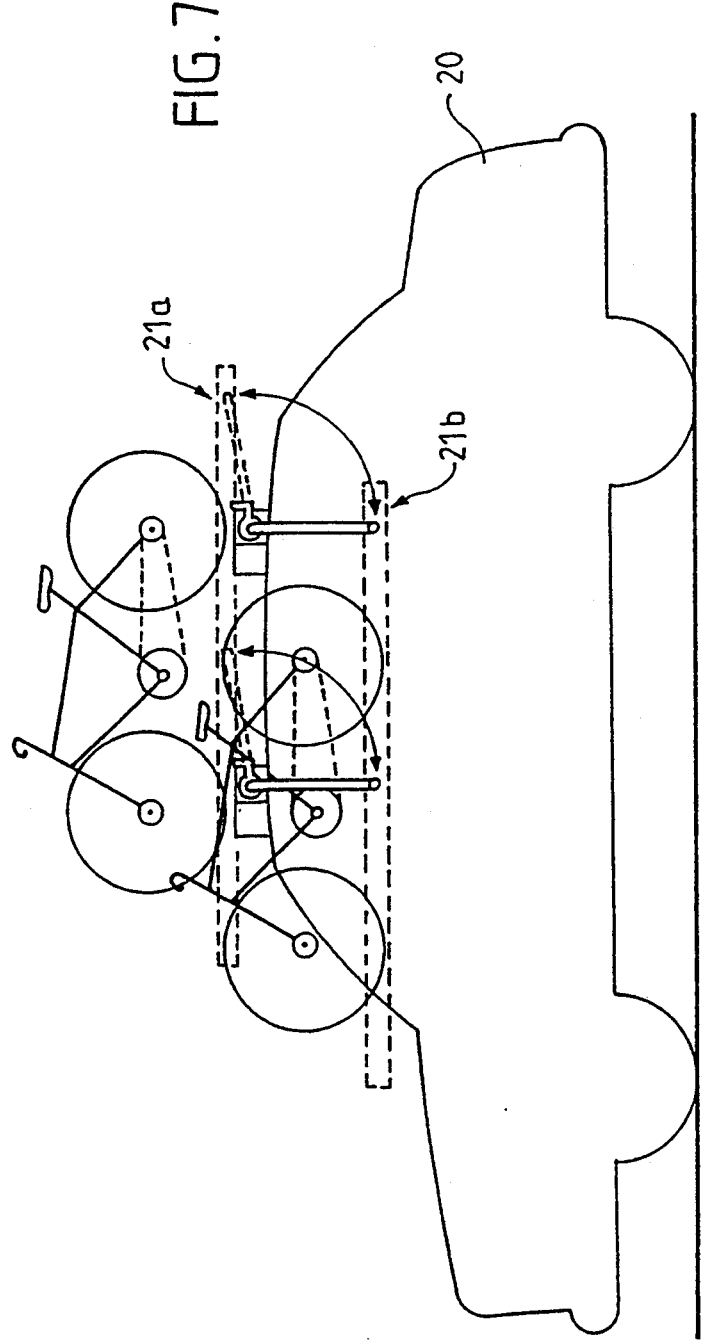
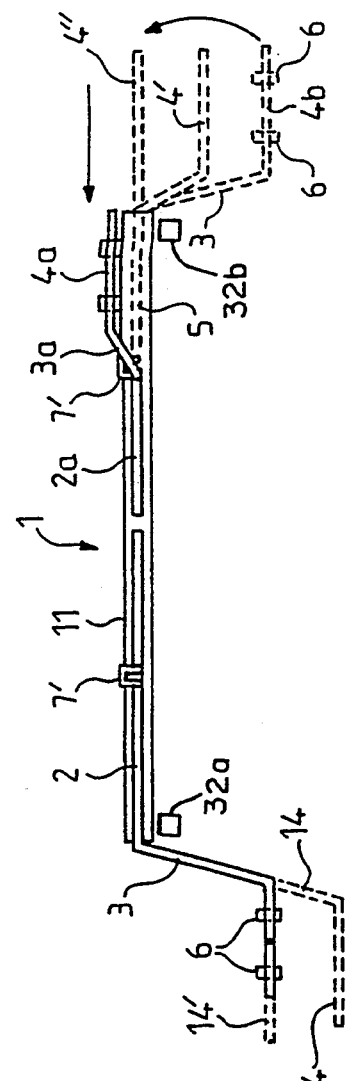

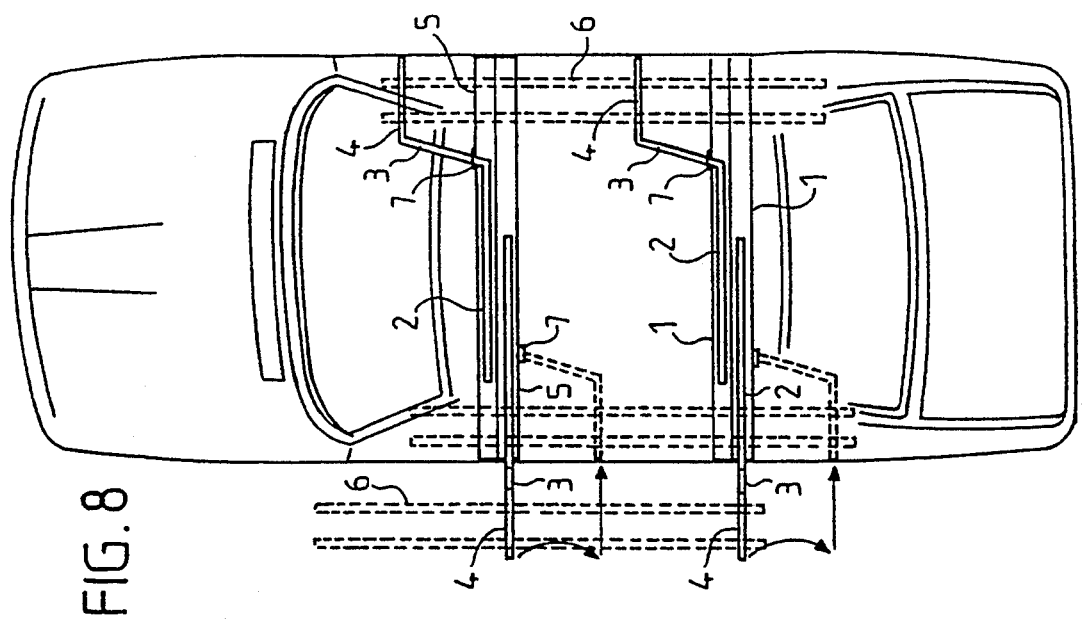
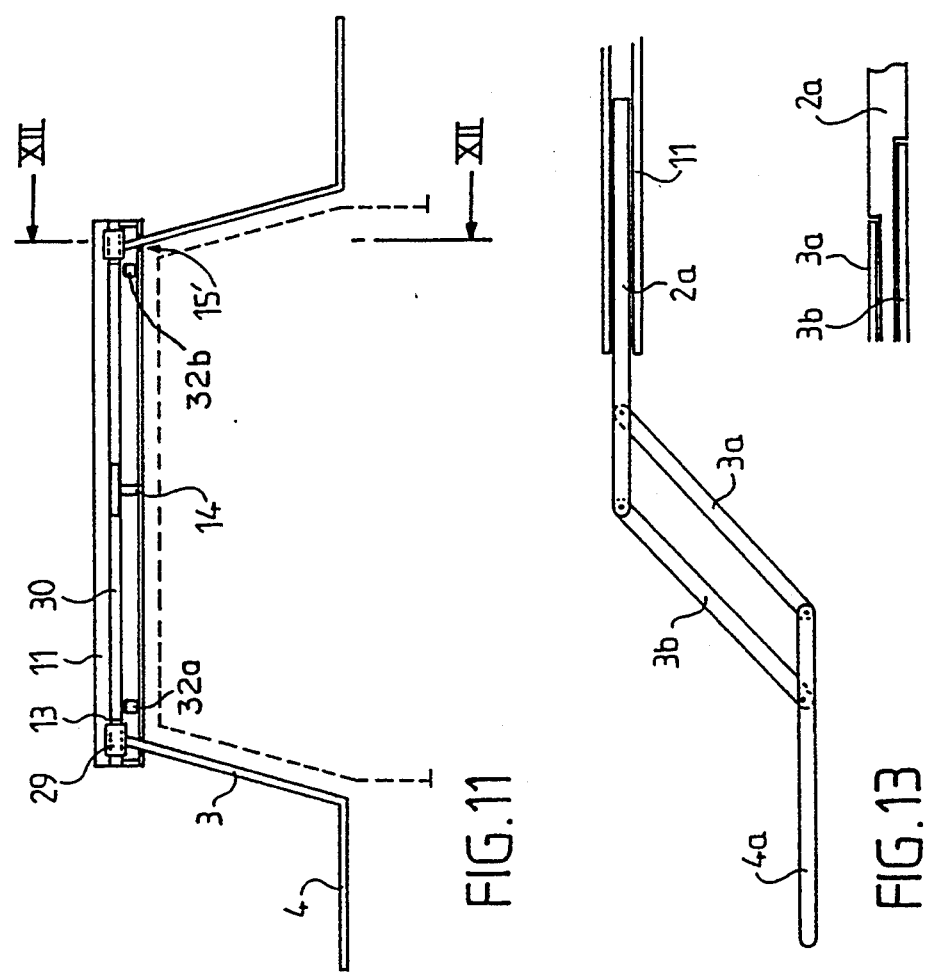
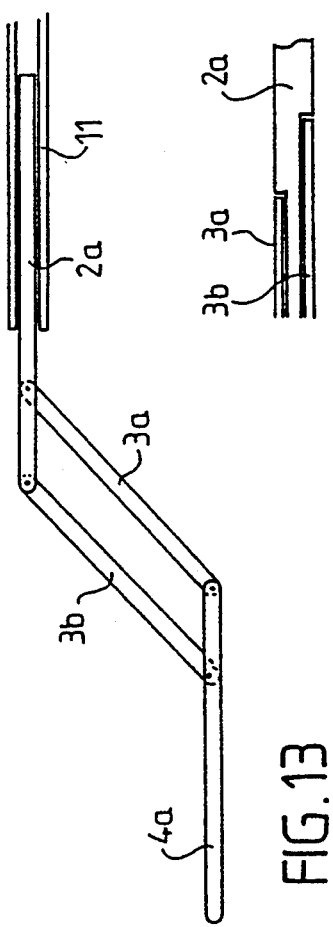

ROOF RACK FOR VEHICLES

FIELD OF THE INVENTION

The present invention relates to a roof rack device for an automobile comprising a supporting bar which comprises fixation means for the load to be supported by said roof rack.

BACKGROUND OF THE INVENTION

A large number of roof rack devices are actually known to be used on the roofs of motor vehicles such as ski racks, simple support bars, etc. which are disposed on the roof of an automobile whereby the legs of these devices engage the rain gutter of the roof of the car in order to maintain the device in its position on the roof of the car. Other systems are also know which are specially conceived for utilization on the roof of cars which do not have rain gutters, whereby these support racks comprise generally support legs which abut on the roof of the car as well as independent fixation means which snugly fit into the profile of the opening of the car door.

All the support devices which are actually known require the mounting of different components on top of the roof of the car and a rigid fixation thereof in their definite position before one may fix the load on these racks. This, of course, requires that the load must be positioned and fixed on the support device only after the definite installation of the rack on top of the roof of the car, which causes an inconveniency, in particular for small or medium size persons because a certain number of manipulations for the positioning and the fixation of the load, luggages, skis, bicycles etc. on said support rack has to be carried out in a position which is not easily accessible.

This inconvenience implies further the danger that certain manipulations for the fixation may be uncompletely executed which may result in a liberation of the load during the travel of the car and in the worst case the load could be completely liberated and cause an accident.

A luggage rack has been proposed which comprises a mechanism that permits lowering the fixation elements of this device laterally of the car in order to more easily access the fixation elements. This downwards movement is effectuated by pivoting certain levers which results, however, also in a pivoting movement of the load.

The device according to this Swiss patent requires the mounting of the load on the lowered portions of the support rack in a pivoted position and on a non-horizontal surface, which is of course an important inconvenience and which renders the various manipulations rather difficult.

SUMMARY OF THE INVENTION

The present invention therefore has the objective to facilitate the mounting of the load on a support rack for vehicles such as described above. This objective is met by a support rack which is characterized in that said support bar comprises a stationary longitudinal element, adapted to be mounted across the roof of a vehicle, in essentially horizontal position, and at least one mobile element, able to slide in horizontal fashion and in longitudinal relationship with respect to said stationary element between a home position and an extended position, whereby said mobile element comprises a guide portion for guiding the horizontal sliding, and a support portion which is adapted to execute a movement having a vertical component, whereby said support portion is adapted so as to maintain a horizontal orientation during its vertical movement, said guide portion cooperating with said stationary element in a manner as to permit the execution of said vertical movement when said mobile element is extended essentially until its extended position, said support portion being in an elevated position when located in its home position as well as during the horizontal sliding movement of the mobile element, said support portion being capable of being lowered during the vertical movement.

A support rack according to the present invention permits positioning the support portion laterally of the car and at an intermediary height such as to permit the user to fasten the load on the support portion without being obliged to access components of the device which are located above the roof of the vehicle, thus permitting execution these manipulations at a convenient height.

The lowering and raising of the support portion and its movement toward the home position as well as its fixation on the support bar may be effectuated by a combination of horizontal and vertical movements of the support portion after fixation of the load in a position which provides ease of such manipulations.

The support rack as mentioned hereinabove may include a latch provided to lock the mobile element in its home position in order to guarantee the security of the load above the roof during the movement of the car.

Advantageously, the stationary element may comprise a tubular shape adapted such as to receive in its interior the guiding portion of the mobile element, said guiding portion being adapted to slide therewithin and along the stationary element.

According to a particular embodiment of the present invention the mobile element may be in the shape of a crank having two parallel portions which are offset one with respect to the other and an intermediary transversal portion connecting the two ends of the parallel portions opposing each other, one of these two parallel portions serving as said guide portion and being received within the interior of the stationary element such as to permit a rotating movement and a translatory movement in a longitudinal direction with respect to the stationary element.

The stationary tubular element may comprise a longitudinal slot which permits the transversal intermediary portion to exit from the interior of the fixed tubular element and to move the mobile element in longitudinal direction with respect to the stationary element, whereby the transversal intermediary portion of the mobile element slides within said slot in longitudinal direction.

According to a different embodiment of the present invention, the guiding portion may comprise a slide having a vertical dimension of sufficient extension to permit the pivoting connection to said slide of first ends of two parallel and vertically distant rods, such as to create a vertical distance between them, the other ends of these rods being connected to the support portion of the mobile element at two pivoting fixation points which are equally separated from each other by said vertical distance. Alternatively, the guide portion may also consist of a bar which is connected to the support portion by two rods whereof the fixation points are situated longitudinally (or horizontally) offset on the support portion and the guide portion.

In this embodiment the stationary element may also be of tubular shape and house the slide in a fashion such as to be mobile in longitudinal direction.

In is home position, the mobile element of this embodiment, i.e. the support portion, the parallel rods and the slide are all aligned within the interior of the tubular stationary element.

In the extended position of the mobile element, only the slide is located within the interior of the stationary tubular element, the rods and the support portion being outside of the stationary element such as to permit lowering the support portion by a simultaneous pivoting movement of the two rods with respect to the slide on the one hand, and with respect to the support portion on the other hand, so as to maintain a parallel orientation of the support portion with respect to the stationary element during the pivoting movement of said rods.

The stationary tubular element may also comprise a longitudinal slot which is located laterally or along a superior portion of said stationary element, whereby this slot is adapted to permit the passage of fixation means for the load from the interior of said tubular element to the exterior thereof, when said support portion is located within the interior of said stationary tubular element.

Advantageously, the support portion of the mobile element may comprise a handle which permits seizing the mobile element in order to move said mobile element between its home position and its extended position.

In order to facilitate the fixation of the load on the support portion, the mobile element may comprise telescopic portions which permit an elongation of the support portion.

In the same way, and in order to permit the positioning of the support portion at a desired height after extension, the parallel rods may also comprise telescopic portions which permit their elongation.

The support rack according to the present invention may comprise two parallel stationary elements which are connected to each other, whereby each includes a mobile element and the two mobile elements may be disposed such as to be extensible on opposite sides of the vehicle.

The support rack according to the present invention may comprise two simple support bars or two assemblies of two support bars each such as described in the preceeding paragraph, whereby the two simple bars or the two assemblies of double bars are parallel and offset from each other, whereby the support portions which are situated at the same side of the vehicle are connected to each other by at least one support rail.

BRIEF DESCRIPTION OF THE DRAWINGS

The invention will now be described more in detail with reference to the drawings whereof:

FIG. 3 is a longitudinal sectional view of a support rack according to the present invention in its home position;

FIG. 4 illustrates a longitudinal sectional view of the same support bar as FIG. 3 in its extended position and in several intermediate positions;

FIG. 7 illustrates a support rack according to a second embodiment of the invention in its home position and in its extended position above the roof of a vehicle;

FIG. 8 illustrates the support rack according to FIG. 7 on the roof of a vehicle seen from above;

FIG. 9 illustrates a longitudinal sectional view of a support bar of a support rack according to FIG. 7;

FIG. 11 illustrates a third embodiment of the invention;

FIG. 13 illustrates a detail of a modification of a mechanism according to FIGS. 3 and 4;

FIG. 13a illustrates a detail of the mechanism according to FIG. 13 seen from above.

DETAILED DESCRIPTION OF PREFERRED EMBODIMENTS

Figure 1:
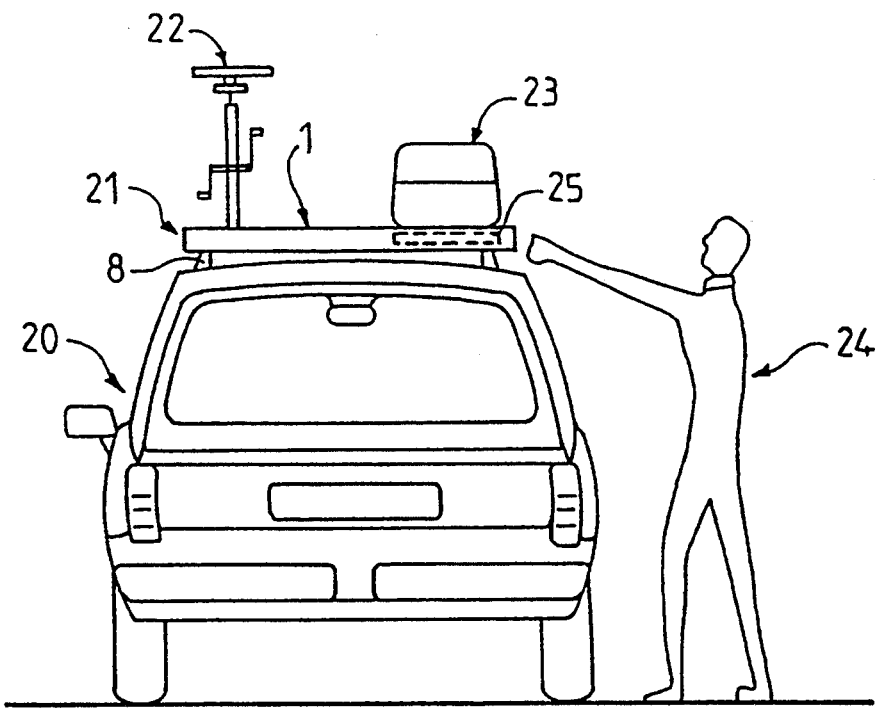
FIG. 1 illustrates a support rack for a vehicle according to the present invention in its home position.

Turning now to FIG. 1, a vehicle 20 is illustrated which carries on its roof a roof rack 21 comprising a support bar 1 which is fastened to the roof of the vehicle 20 on its legs 8 with the aid of traditional fixation means. The support bar 1 carries a bicycle 22 as well as a case 23 which are fixed on the bar 1 by a traditional fixation means such as currently used with known support bars.

A user 24 is illustrated on the side of the vehicle 20 in order to show that any manipulation for fixing bicycle 22 or case 23 or others, need to be effected traditionally above the roof of the vehicle in a manner which renders those manipulations rather difficult or even impossible for users of small size.

Reference sign 25 shows schematically the existence of a mechanism which permits to develop or to extend the support bar 1 such as to obtain a lateral extension and a lowering of a portion of support bar 1 in order to permit the user 24 to fasten the load on the extended and lowered support portion at a level which is more convenient.

Figure 2:
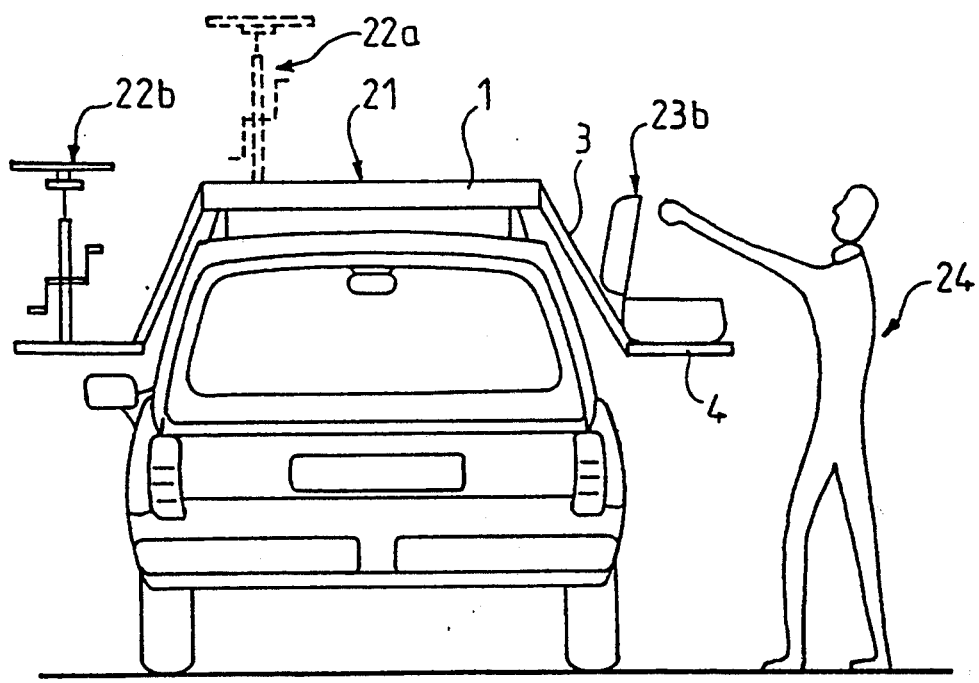
FIG. 2 illustrates the same device as FIG. 1 in its extended position.

FIG. 2 shows the same vehicle 20 with the support rack 21 according to FIG. 1 in its extended position and one understands easily the improvement of the conditions for the fastening of the load for user 24 after the positioning of mechanism 25 of bar 1 in its extended position.

The mechanism of extension which is generally indicated with reference sign 25 in FIG. 1, comprises a support portion 4 which, independently of the position of mechanism 25 remains always in a horizontally oriented position, as well as an intermediary portion 3 which connects the support portion 4 generally to the support bar 1.

Bicycle 22 of FIG. 1 and storage case 23 may thus be mounted on the support portion 4 during its extended and lowered position, and after fixation of the load on the support portion in positions 22b and 23b, the support portion 4 as well as the load which is supported thereon may be lifted above the roof of the car by a combined horizontal and vertical movement until it finally assumes a position such as indicated in FIG. 1, in which position mechanism 25 may be latched.

FIG. 3 is a longitudinal sectional view of support bar 1 mounted across the roof of a car 9, where it is supported by two legs 8. Support bar 1 comprises a stationary tubular structure 11, at the interior of which there is arranged a mobile element which comprises essentially a slide 2, two parallel rods 3' and a bar 4 which serves as the port portion such as described in FIG. 2, whereas the two rods 3' correspond to the intermediary element 3 of FIG. 2. The tubular structure 11 comprises at its upper surface a non-represented longitudinal opening which permits the passage of fixation elements, whereby this opening extends at least over a portion of the length of the tubular structure.

The two parallel rods 3' are each fixed by one of their ends to slide 2 at two points of pivoting fixation, the other ends being fixed on the support portion 4 also at two points of pivoting fixation 13.

The two points of pivoting fixation on each end of the parallel rods 3' are positioned each time one above the other, and are separated by an essentially identical distance, such as to permit to maintain the vertical superposition of the two fixation points 13 during the pivoting movement of the rods 3'.

End 12 of the support portion 4 which is remote from the end of the support portion 4 which is connected to the two rods, is provided with a handle 5 in order to permit extraction of the mobile element from the tubular structure of the support bar 1.

Handle 5 comprises a portion 7 including a not shown latch which permits latching handle 5 in the position such as illustrated in FIG. 3.

A second handle 5' is arranged at the other side of the car roof and belongs to a second stationary element which is positioned in parallel and in symetric relationship behind the one shown.

The mobile element consists essentially of slide 2, rods 3' as well as the support portion 4 and is disposed at the interior of the tubular structure 11 of support bar 1 such as to permit its actual extraction by applying a traction force onto handle 5. FIG. 4 shows several positions of rods 3' and of support portion 4 after extraction of the entire mobile element and in various vertical positions. Once the mobile element is pulled until its most extracted position from the tubular structure, slide 2 is still maintained within the tubular structure 11 by cooperation of a projection 12" of the slide with an abutment 12' (illustrated in dotted lines) of the tubular structure 11, whereas rods 3' and support portion 4 have completely been liberated from the tubular structure 11.

In this position one may freely lower the support portion 4 by a simultaneous pivoting movement of the two rods 3' such that support portion 4 remains horizontal thanks to the simultaneous action of the two rods 3', which action assures that the two fixation points 13 always remain in a vertical alignment.

Slide 2 may comprise rolls 1a in order to facilitate longitudinal movement thereof within the interior of the tubular structure 11.

In FIG. 4 the mobile element is indicated in a first upper position in dotted lines, which position represents the beginning of the lowering of the support portion 4, which lowering comes to an end in an intermediary position such as designated in full lines.

Rods 3' may comprise telescopic portions 14 which permit further lowering of support portion 4 in order to assume a still lower position such as indicated again in dotted lines.

Optionally support portion 4 may also comprise telescopic portions 14a which permit extending the support portion 4 in order to create more space during the fixation of the load.

Extension 7 of handle 5 may serve as a cover for the leg 8 as well as support plate for a latch means which connects extension 7 to leg 8.

Figure 5:
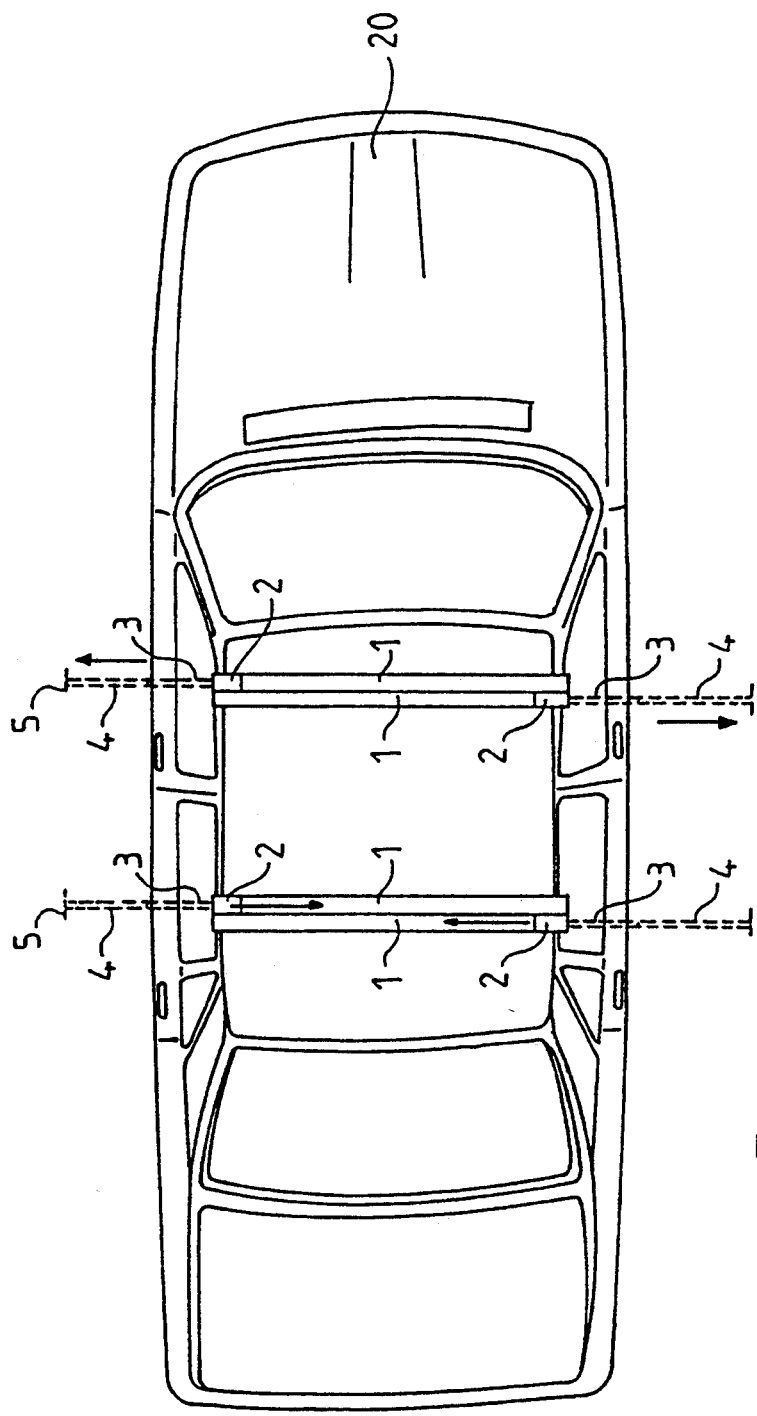
FIGS. 5 and 6 illustrate a support rack shown in FIG. 5 but installed above the roof of a vehicle.

FIG. 5 illustrates a car 20 shown from above and one recognizes easily two pairs of support bars 1 whereof each pair comprises two bars which are oriented in inversed directions such as to permit the extension of mobile elements 3, 4 on either side of each pair of support bars 1.

The pairs of support bars are mounted on the roof of the car at locations which are spaced from each other in a longitudinal direction of the car in order to define a fixed plane which permits the stabilization of the load at at least two points.

Figure 6:
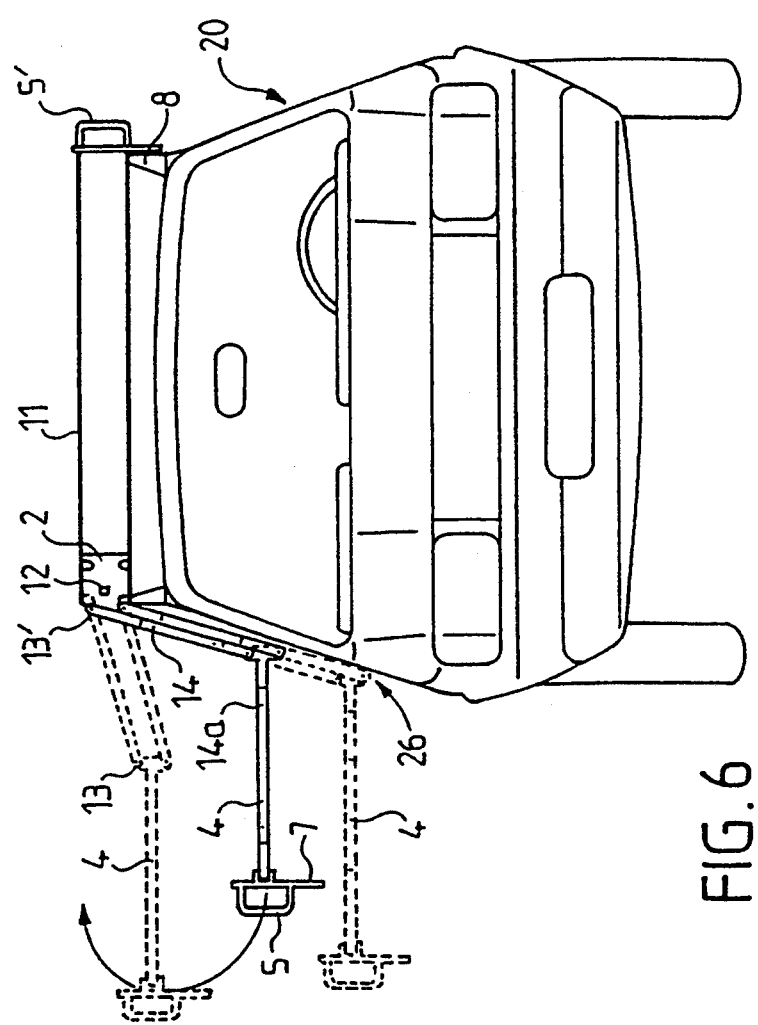

FIG. 6 illustrates details of the support bar according to FIG. 4 positioned on the roof of a car 20 and one may easily understand the advantages of the present invention which provides the possibility of fastening the load on the support portion 4 in a lowered position, either in a position such as illustrated in full lines or even further extended until the end of the extension of the telescopic mechanism 14. This clearly explains the advantages over a support rack such as illustrated in FIG. 1, and the necessary manipulations during the utilization of such traditional support racks.

One may further provide to limit the liberty of the pivoting movement of rods 3' in downward direction in order to eliminate any possibility that the rods could touch the side portions of the car for example at point 26. This limitation may be incorporated by an abutment at any convenient location, or for instance by a lever which extends between the upper fixation point 13' of the slide and the lower fixation point 13 of the support portion 4, in order to limit the variation in the distance between these two fixation points. One may also envisage to provide a flexible pad which may be fastened to the lower rod in order to permit the abutment of this lower rod onto the side portion of the car without any danger of scratching the surface thereof.

Figure 10:
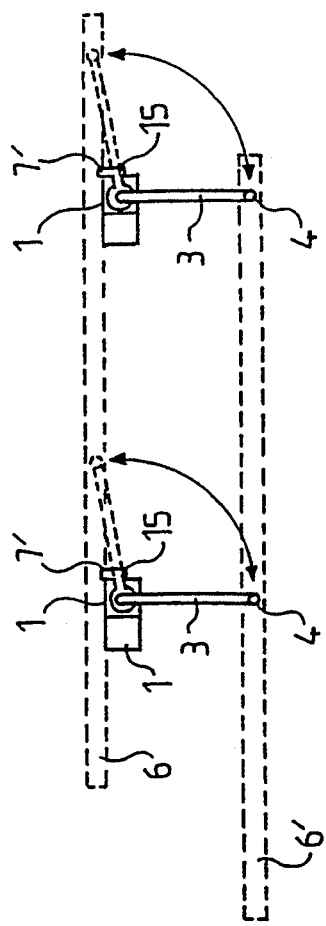
FIG. 10 illustrates a cross-sectional view of the device according to FIG. 7.

FIG. 7 shows a support rack according to a different embodiment of the present invention on the roof of a car 20, whereby this embodiment is shown more clearly in FIG. 10, wherein the load and the phantom shape of the car have been omitted.

In FIG. 10 one can see two pairs of support bars 1 whereof the mobile elements which comprise support portions 4 and intermediate portions 3 are indicated in two positions.

The mobile element according to this embodiment of the invention is constituted by a single piece in the form of a crank, the function of which will be described in detail with reference to FIGS. 9 and 11. Each crank comprises a guide portion 2 positioned at the interior of support bar 1 and adapted such as to slide axially with respect to support bar 1 and which is further capable of executing a rotation about its own longitudinal axis. This guide portion 2 is connected to support portion 4 by means of intermediate portion 3 and the three portions 2, 3 and 4 form an integral non-deformable member.

One may easily understand in particular in view of FIGS. 8, 9 and 11 that the rotation of the guide portion 2 within the interior of support bar 1 permits the movement of the support portion 4 along an orbital trajectory whereof intermediary portion 3 constitutes the radius.

This rotation of the mobile element which has the form of a crank, may be permitted over 360° or only over a limited angle of essentially 90° or somewhat more for reasons as described further hereinbelow.

As illustrated in FIG. 10, the two support portions 4 which are visible in the form of small circles of projection only, are connected with each other by a support rail 6. This rail is in its lower position when the crank is orientated such that intermediate portion 3 is directed downwardly, and during the rotation of the crank about a quarter of a full circle, said rail 6 may be lifted to a position at the level of the support bars 1 or even beyond these support bars, if the rotation about a quarter of the circle is sufficiently extended to permit a passage of rail 6 beyond bar 1. This lifting of the rail above the support bar 1 is of course executed while the support portion 4 is in its extended position in order to permit the passage of the rail on top of support bars 1.

As indicated in FIG. 8 which shows the support rack according to this second embodiment of the present invention seen from above the car, the dotted lines illustrate the lifted position of the crank which differs from the extended and the lowered position (in full lines) not only by a different vertical position of support portion 4 but also by a different position of horizontal extension.

The support rack of FIG. 8 comprises two support rails 6 at each side of the car, which support rails connect the two support portions 4 of the two mobile elements which are extensible from the same side of the car.

In FIG. 9, the support rack according to the present invention comprises a single support bar and a support structure 11, the two crank 2, 3, 4 being introduced by opposite ends of the tubular structure. The left crank 2, 3, 4 is illustrated in its lowered position in full lines, to other positions of extension by the telescopic portions 14 (for vertical extension) and 14' (for horizontal extension) being illustrated in dotted lines. The right crank is indicated in full lines in its home positions 2a, 3a, 4a and latched by latch member 7, and in three different extended positions, upper position 4" and lowered positions 4' and 4b.

One may easily realize from FIG. 8 that the two support rails 6 move longitudinally and cross wise with respect to the car during the rotation of the two cranks which produces further a vertical movement of the two support rails 6, and by axial sliding of the cranks along the support bars respectively.

Figure 14:
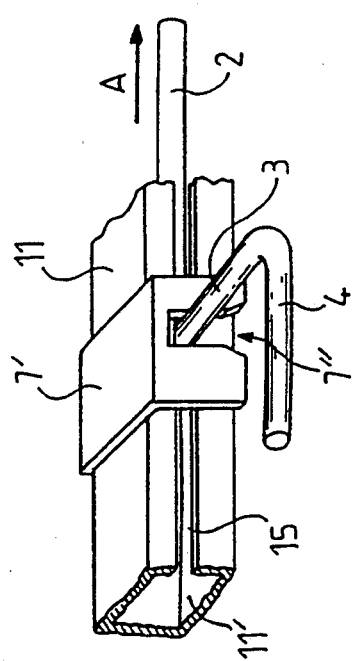
FIG. 14 illustrates details of the latch mechanism.

As illustrated in FIG. 9, support bar 1 may comprise a latch means 7' which permits immobilizing crank 2, 3, 4 in its upper position. This latch means may for instance comprise a member which is axially fixed on bar 1 but which may move in vertical direction in order to liberate or cover a longitudinal slot 15 in which intermediate portion 3 is slidingly received. The latch member may comprise a vertical slot which crosses slot 15 of bar 1 and which maintains intermediate portion 3 at the point of intersection of the two slots. FIG. 14 depicts latch 7' in more detail.

Further, telescopic portions 8 may be provided on intermediary portion 4 as well as on support portions 4 in order to permit an ideal adjustment of the support portion 4 before the fixation of the load thereon.

FIG. 11 shows a third embodiment of the present invention which differs from the embodiment of the crank type only by the fact that the guiding portion consists of a cylinder 29 which is adapted to slide on a bar 30 which is arranged at the interior of the tubular portion of support bar 1. The movement of mobile element 29, 3, 4 of this embodiment is similar to the movement of the mobile element described with respect to FIGS. 8, 9 and 10, with the exception that the axial sliding of the guiding portion is not effected by a sliding of a bar within the interior of a tubular element but rather by the sliding of a tubular element on a fixed bar.

This fixed bar 30 may be held at its ends by the end walls of the tubular bar 1 as well as by a central leg 14 which may optionally be provided in order to increase the stability of the assembly.

In both embodiments of the mobile element in form of a crank, the tubular bar 1 comprises longitudinal slots in order to permit the passage of the intermediary portion 3 during the translatory movement of the mobile element whereof one portion is located within the interior of the tubular bar 1 and another portion is located outside thereof.

This longitudinal slot, in particular in the case as illustrated in FIG. 11, may end in a more or less peripherally oriented slot 15 which serves as guide for the rotation of the mobile element.

Figure 12:
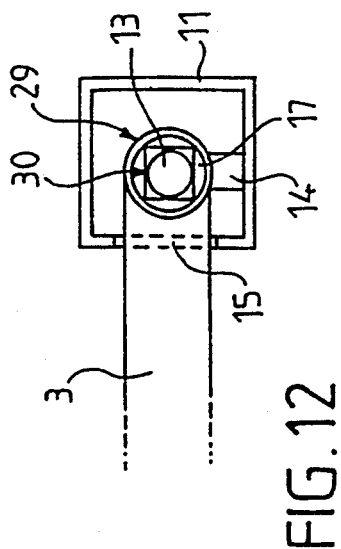
FIG. 12 illustrates a detail of FIG. 11.

FIG. 12 illustrates a detail of the assembly according to FIG. 11. FIG. 12 represents a transverse sectional view along lines XII—XII of FIG. 11 and one can distinguish the tubular support member 11 having a rectangular profile, within which is located bar 30 which comprises over its longer portion also a rectangular cross section. Bar 30 has a portion 13, corresponding to the location of cylindrical portion 29 of the mobile element in FIG. 11, in which portion 13 bar 30 comprises a circular cross section.

The cylindrical portion 29 of the mobile element comprises at its interior a packing element 17 which provides an inner rectangular opening serving as guide for the sliding of the tubular portion 29 along bar 30 in a manner as to inhibit a possible rotation of the mobile element about bar 30 due to the positive engagement of the rectangular section of bar 30 in the interior of the packing element 17 of the cylindrical portion 29.

As soon as the mobile element is located in its extracted position such as indicated in FIG. 11, the cylindrical portion 29 is situated around portion 13 of circular cross-section such as to permit rotation of the mobile element about bar 30 in order to effectuate the lowering of the support portion 4 of the mobile element.

In FIG. 12 there is also visible slot 15 of the tubular element 11, which slot serves to permit the intermediary portion 3 of the mobile element to traverse the side wall of element 11 in order to connect portion 29 which is located at the interior of the tubular bar with support portion 4 which is located outside thereof.

FIG. 13 depicts a detail of a modified embodiment similar to that of FIG. 3.

Whereas in FIG. 3 the vertical dimension of the tubular section and the concerned components of the mobile element are selected sufficiently large in order to permit to situate the two points of fixation of the two rods 3 onto the slide 2 in vertically spaced relationship, one may also provide a solution to locate these fixation points horizontally side-by-side and in sufficient distance from each other on guide portion 2a as well as on support portion 4a respectively. This disposition provides the advantage that the stationary tubular structure 11, in particular in an embodiment where the mobile element slides within the interior of this stationary element, may be executed such as to avoid excessive height and to conform thereby to the typical dimensions of a traditional support rack.

The type of fixation and the thickness of rods 3a as well as of the end portions of the support portion 4a and guide portion 2a may be such that the transversal cross section of the mobile element is practically constant over its entire length when the support portion 4a is in actual alignment with guide portion 2a.

FIG. 13a illustrates this disposition.

FIG. 14 shows the latch mechanism in more detail, whereby the stationary tubular element 11 has a hollow square cross-section including a longitudinal slot 15. Guide portion 2 of a crank 2, 3, 4 is received within stationary tubular member 11 such as to be capable of sliding in both longitudinal directions as indicated by arrow A, whereby guiding portion 2 is held within the interior 11' of stationary tubular member 11 by any conveniently positioned bearings, which are not shown.

Intermediary portion 3 of mobile element 2, 3, 4 which has the shape of a crank, exits from the interior 11' of the tubular stationary member 11 through slot 15 in order to meet support portion 4 which is always located outside of tubular member 11, and during axial movement of guide member 2 within the tubular member 11 in accordance to arrow A, intermediary member 3 slides along slot 15.

Latch member 7' which is illustrated in FIG. 14 in its latching position, may be lifted so that its vertical slot 7'' completely liberates slot 15 of tubular member 11, such that crank 2, 3, 4 may freely slide along the entire length of its permetted stroke.

Latch member 7' is connected with tubular member 11 by any conventional means (not shown) which permit to maintain latch member 7' in a axially fixed position with respect to the tubular member 11, however in a manner which permits partial lifting of latch member 7' in a direction perpendicular to the longitudinal extension of tubular member 11 so as to completely liberate slot 15 in order to permit unhindered sliding of intermediary member 3 within slot 15.

In order to lock crank 2, 3, 4 in its home position, latch member 7' is lowered in its position indicated in FIG. 14 while intermediary member 3 is in a position which is shown in FIG. 14, such as to immobilize intermediary portion 3 at the intersection of slots 5 and 7'' which makes any further axial sliding of crank 2, 3, 4 within tubular member 11 impossible.

Any conventional locking mechanism may be provided in order to lock latch member 7' in its position as shown in FIG. 14.

Slot 7'' may have a tapered entry opening in order to faciliate operation of latch 7'.

The present invention has been described hereinabove with reference to several embodiments, it being understood that the invention is not limited to the illustrated details.

A number of modifications may be carried out on a device such as described hereinabove without departing from the spirit of the present invention.

Thus, one may provide that the sliding of the mobile element does not imply axial movement of a member within a tubular structure, but outside of and along a non-covered guide bar, which may have the advantage to inhibit accumulation of humidity at inaccessible locations.

Further one may provide in a system according to FIG. 11 that bar 30 has square cross-section along its entire length, whereby the side portions comprise a twist such as to guide a spiral rotation of the crank during its final part of extension.

The support rails 6 may be replaced by rails which are rigidly fixed on to the roof of the car, which may be envisaged in particular in case where the load itself is rigid and easy to fasten on the support portions 4, such as a long storage case.

It is also possible to provide means for mechanical assistance 32a/32b for the devices described hereinabove, whereby said assistance may be an active assistance in form of a motor or a passive assistance in form of a spring, in order to help the user to lift the load above the roof of the car after its fixation onto the support portions in extended and lowered position.

A means of mechanical assistance 32a/32b of this type may be connected between the mobile portions of the mobile element in order to assist the lifting of the load to the level of the roof only, or it may also be connected to the stationary elements in order to assist the horizontal shifting of the lifted load to assume its correct transversal position above the roof of the car.

I claim:

1. A roof rack for carrying a load on a roof of a vehicle, adapted to be mounted on the roof of the vehicle, comprising:

a support bar having a means for fixing the load to be carried thereto;

said support bar comprising a stationary longitudinal element, adapted to be mounted across the roof of the vehicle in a generally horizontal position;

at least one mobile element capable of sliding horizontally and longitudinally with respect to said stationary element between a home position and an extended position;

said at least one mobile element comprising a guide portion for guiding the horizontal sliding motion and a support portion adapted to execute a movement having a vertical component, said support portion being connected to the guide portion so as to maintain a horizontal orientation during vertical movement thereof;

said guide portion cooperating with said stationary element so as to permit the execution of said vertical movement when said at least one mobile element is in said extended position, said support portion being in an elevated position when said at least one mobile element is in said home position as well as during horizontal sliding of said at least one mobile element, and is capable of being lowered during said vertical movement.

2. The roof rack according to claim 1, further comprising a latch means for latching the at least one mobile element in said home position.

3. The roof rack according to claim 1 wherein said stationary element is tubular in shape, having a hollow interior, and is adapted to receive within said interior said guide portion of the at least one mobile element, said guide portion being adapted to slide along the stationary element.

4. The roof rack according to 3, wherein said at least one mobile element comprises the shape of a crank, having two parallel portions which are laterally spaced one from the other, and an intermediary portion connecting the two parallel portions, one of said parallel portions serving as said guide portion and being received within the interior of the stationary element to permit the execution of a rotational and a longitudinally translational movement of the at least one mobile element with respect to the stationary element.

5. The roof rack according to claim 4, wherein the stationary element includes a longitudinal slot which permits the intermediary portion of the at least one mobile element to exit form the interior of the stationary element and to move the at least one mobile element in a longitudinal direction with respect to the stationary element, whereby the intermediary portion of the at least one mobile element slides along said longitudinal slot.

6. The roof rack according to claim 1 further comprising two parallel rods, each rod having a first end and a second end, wherein said guide portion has the shape of a slide of sufficient vertical dimension to pivotally connect thereto said two first ends of the two parallel rods, said two first ends being vertically Spaced from each other by a vertical distance (d), the second ends of the two parallel rods being connected to the support portion of the at least one mobile element at two points of pivoting fixation, said two points being separated from each other generally by the same vertical distance (d).

7. The roof rack according to claim 1, wherein the guide portion comprise a guide bar which is adapted to slide longitudinally within or outside of said support bar, and said support portion comprises a bar which is movably connected to said guide portion by a pair of rods, said rods having end portions fixed to the support portion and the guide portion at longitudinally separated points of fixation respectively.

8. The roof rack according to claim 6, wherein said stationary element has a tubular shape with a hollow interior, said interior being shaped to slidably receive said guide portion therein.

9. The roof rack according to claim 8, wherein in the home position, the support portion, the parallel rods and the guide portion are aligned within the interior of the stationary element.

10. The roof rack according to claim 9, wherein in the extended position only the guide portion is maintained within the interior of the stationary element, the rods and the support portion being located exterior to the stationary element so as to permit lowering of the support portion by simultaneous pivoting movements of the two rods with respect to the guide portion at the first end of said rods, and with respect to the support portion at the second end of said rods, whereby the support portion maintains an orientation parallel to the stationary element during the pivoting movement of said rods.

11. The roof rack according to claim 10, wherein the stationary element includes a laterally disposed opening over an upper portion of its length to permit the passage of said means for fixing the load when the support portion is located within the interior of the stationary element.

12. The roof rack according to claim 6, wherein the support portion of the at least one mobile element comprises a handle which permits seizure of the at least one mobile element in order to move the at least one mobile element between the home position and the extended position.

13. The roof rack according to claim 6, wherein the at least one mobile element includes telescoping portions which permit an elongation of the support portions.

14. The roof rack according to claim 6, wherein said parallel rods include telescoping portions which permit their elongation.

15. The roof rack according to claim 1 further comprising a second stationary element, wherein said two stationary elements are parallel and connected to each other, each stationary element having a mobile element, said two mobile elements being arranged to permit extension thereof at mutually opposite sides thereof.

16. The roof rack according to claim 1 further comprising a second roof rack, said two roof racks being arranged in parallel and spaced relation one with respect to the other, wherein the support portions are connected one to the other by means of a support rail.

17. The roof rack according to claim 4, wherein the guide portion comprises a bar adapted for axially sliding within the interior of the stationary element.

18. The roof rack according to claim 4, wherein the guide portion has a tubular shape adapted to slide longitudinally on a bar supported within the interior of the stationary element.

19. The roof rack according to claim 18, wherein the bar supported within the interior of the stationary element comprises a portion of rectangular cross-section and a portion of circular cross-section, and the guide portion comprises a rectangular interior cross-section of dimensions similar to the dimensions of the portion of the rectangular cross-section of the bar Supported within the interior of the stationary element to permit a rotation of the guide portion about the bar when the guide portion is located in a position corresponding to the portion of circular cross-section of the bar and inhibiting a relative rotation between the bar and the guide portion when the guide portion is in a position corresponding to the rectangular cross-section of the bar.

20. The roof rack according to claim 1, wherein the support bar has an outside on which the guide portion may slide in a longitudinal direction.

21. The roof rack according to claim 2, wherein the latch means comprises a latch member which is mounted on the stationary element in a longitudinally stationary position permitting movement of said latch member in a direction perpendicular to said stationary element, whereby said latch member has a vertical slot in which an intermediary portion of the at least one mobile element may be received during closure of the latch member.

22. The roof rack according to claim 1, further comprising a means for providing mechanical assistance in the form of a spring connected to the stationary element and/or to the at least one mobile element.

23. The roof rack according to claim 1, further comprising a means for providing mechanical assistance in the form of a motor connected to the stationary element and/or to the at least one mobile element.

* * * * *